United States Patent Office 2,803,608
Patented Aug. 20, 1957

2,803,608

PHENOL-FORMALDEHYDE MOLDING COMPOSITION FOR PLASTIC CLOSURES

Carlton A. Richie, Toledo, Ohio, assignor to Owens-Illinois Glass Company, a corporation of Ohio No Drawing. Application March 2, 1954,
Serial No. 413,706

5 Claims. (Cl. 260—17.2)

This invention relates to plastics and particularly to a molding composition for plastic closures such as are applied to glass containers.

According to a currently used method of manufacturing plastic closures, a measured quantity of plastic material in granular form is supplied to a mold and the closure is molded by application of heat and pressure. Among the most commonly used plastic compositions are those of the phenol-formaldehyde type. A satisfactory molding composition must fulfill certain basic requirements. The plastic material must be capable of flowing easily and being cured rapidly. The resultant plastic closures must have good appearance, low water absorption, high torque strength and relatively high specific gravity.

It is an object of this invention to provide an improved molding composition of the phenol-formaldehyde type which fulfills the basic requirements of a molding composition for plastic closures.

Other objects of the invention will appear hereinafter.

I have found that the improved molding composition comprises a phenolic resin, a filler, such as woodflour, and kaolin. I have further found that the basic materials should be thoroughly mixed, for example, by working on hot rolls. In addition, the resin may be in either dry or liquid form.

The following table lists compositions which have been found to be satisfactory together with a comparison of the properties of the improved compositions with the properties of a standard phenolic composition:

| Molding Powder Designation | A | B | C | D | Standard Phenolic |
|---|---|---|---|---|---|
| Percent Composition: | | | | | |
| Resin | 48 | 48 | 40 | 36 | 48 |
| Woodflour | 36 | 24 | 28 | 30 | 48 |
| Kaolin | 12 | 24 | 28 | 30 | 0 |
| Carbon Black | 3 | 3 | 3 | 3 | 3 |
| Zinc Stearate | 1 | 1 | 1 | 1 | 1 |
| Flow (ASTM Cup Flow Test, D731-48T) | 18 | 18 | 12 | 11 | 13 |
| Water Absorption, Percent | | 5.48 | 5.38 | | 7.15 |
| Torque | 58 | 72 | 71 | 61 | 40 |
| Spec. Gravity | 1.43 | 1.51 | 1.56 | 1.58 | 1.36 |

The above compositions may be mixed, for example, by working on hot rolls in accordance with standard procedures.

Closures made from the improved molding compositions were more rapidly cured than those made from the standard compositions. For example, closures weighing 3.3 grams were molded at 120 pieces per minute when using composition B as contrasted to 88 pieces per minute when using the standard phenolic composition. Closures weighing 22 grams were molded at 24 pieces per minute when molded from composition B as contrasted to 14 pieces per minute when molded from the standard phenolic composition. In addition, the closures had a smoother surface resulting in an improved appearance.

As noted in the above table the flow characteristic of the improved plastic composition is at least equal to that of the standard plastic composition. The absorption properties are less than those of the standard composition. Closures made from the improved compositions show higher torque strength and higher specific gravity than closures made from the standard composition.

As heretofore indicated, the resin which is used may be of the liquid phenolic type. The term liquid phenolic resin is used to designate a resin formed by the interaction of phenol and formaldehyde wherein the process is interrupted leaving volatile constituents, mainly water, in the resin. Such a resin is more easily worked on hot rolls but the working time is prolonged due to the fact that the volatile constituents must be removed during the working. In addition to offering the improved properties in the resultant closure, the addition of kaolin to a liquid phenolic resin facilitates the working of the plastic composition on the hot rolls.

Among the compositions, using liquid resin, which have been found to be satisfactory, are the following:

*Example I*

| | Grams |
|---|---|
| Liquid resin (79% solids) | 608 |
| Woodflour | 280 |
| Kaolin | 200 |
| Carbon black | 30 |
| Zinc stearate | 10 |

*Example II*

| | Grams |
|---|---|
| Liquid resin (78.4% solids) | 613 |
| Woodflour | 280 |
| Kaolin | 200 |
| Carbon black | 30 |
| Zinc stearate | 10 |

*Example III*

| | Grams |
|---|---|
| Liquid resin (86% solids) | 560 |
| Woodflour | 280 |
| Kaolin | 200 |
| Carbon black | 30 |
| Zinc stearate | 10 |

A computation of the percent composition of the molding compositions I, II and III on a dry basis would show that the compositions contain 48% resin, 28% woodflour, 20% kaolin, 3% carbon black and 1% zinc stearate.

In addition to the aforementioned properties, closures made from the improved molding compositions showed low shrinkage and high dimensional stability.

Molding compositions of the improved type show improved bulk factor characteristics. Bulk factor is defined as the change in volume of the plastic material measured before and after molding. A standard phenolic composition had a bulk factor of 3.24, as contrasted to a composition containing 20% kaolin which had a bulk factor of 2.34.

Modifications may be resorted to within the spirit and scope of the appended claims.

I claim:

1. A molding composition for plastic closures, each 100 parts by weight of said molding composition comprising 36–48 parts of phenol-formaldehyde resin, 24–36 parts of woodflour, 12–30 parts of kaolin, and small amounts of carbon black and zinc stearate.

2. A molding composition for plastic closures, each 100 parts by weight of said molding composition comprising 48 parts of phenol-formaldehyde resin, 36 parts of woodflour, 12 parts of kaolin, and small amounts of carbon black and zinc stearate.

3. A molding composition for plastic closures, each 100 parts by weight of said molding composition comprising 48 parts of phenol-formaldehyde resin, 24 parts of woodflour, 24 parts of kaolin, and small amounts of carbon black and zinc stearate.

4. A molding composition for plastic closures, each 100 parts by weight of said molding composition comprising 40 parts of phenol-formaldehyde resin, 28 parts of woodflour, 28 parts of kaolin, and small amounts of carbon black and zinc stearate.

5. A molding composition for plastic closures, each 100 parts by weight of said molding composition comprising 36 parts of phenol-formaldehyde resin, 30 parts of woodflour, 30 parts of kaolin, and small amounts of carbon black and zinc stearate.

References Cited in the file of this patent

UNITED STATES PATENTS

| | | |
|---|---|---|
| 1,580,425 | Ellis | Apr. 13, 1926 |
| 2,337,523 | Lum | Dec. 21, 1943 |
| 2,551,282 | Palmer et al. | May 1, 1951 |